Patented Feb. 19, 1946

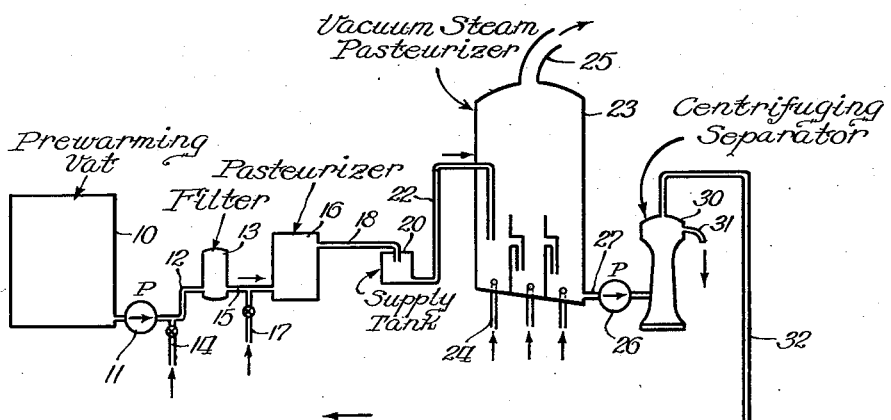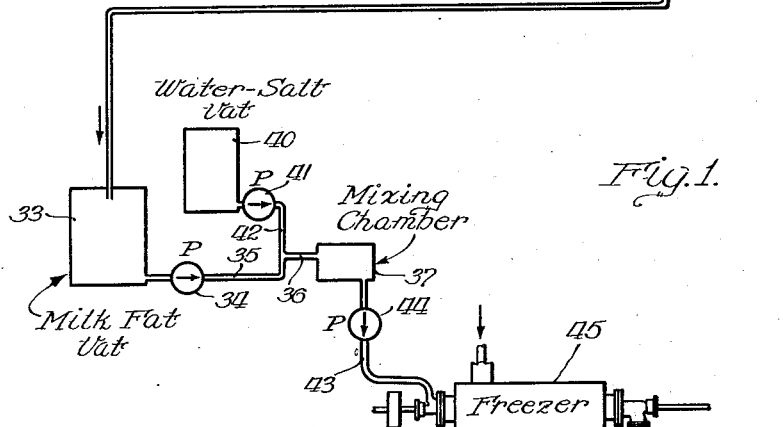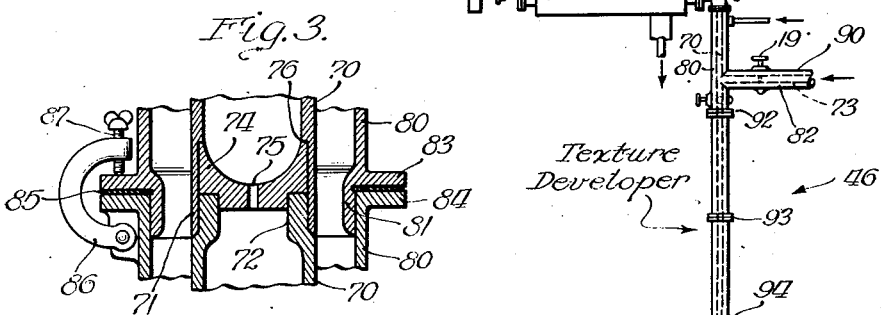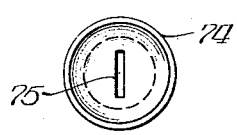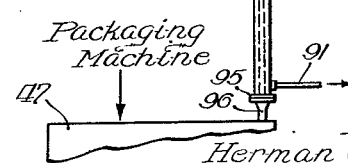

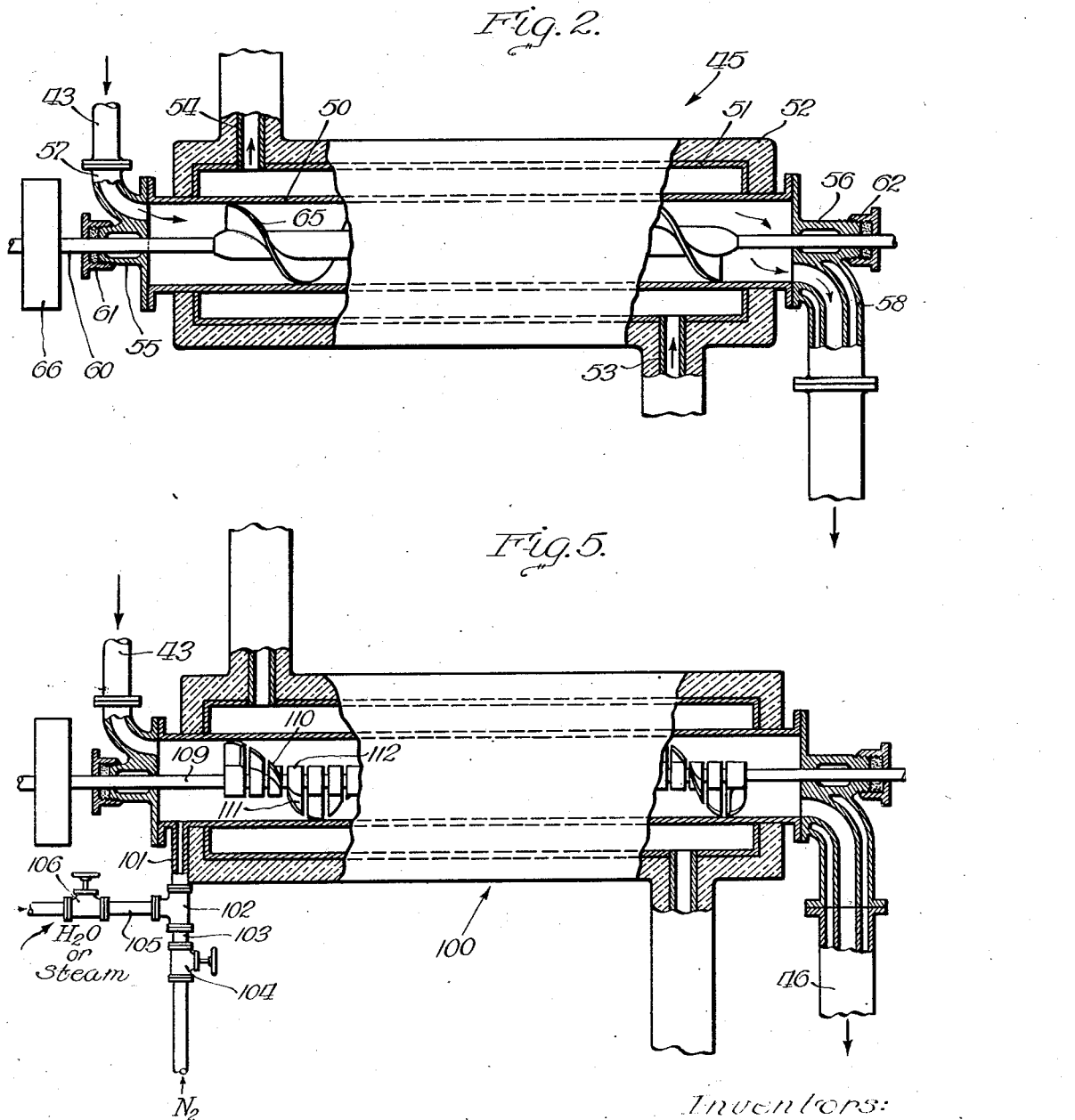

2,395,051

UNITED STATES PATENT OFFICE 2,395,051

BUTTERMAKING MEANS

Herman C. Horneman, Ralph V. Hussong, and Sidney N. Quam, Danville, Ill., and Bernard W. Hammer, Ames, Iowa, assignors, by mesne assignments, to Cherry-Burrell Corporation, Chicago, Ill., a corporation of Delaware Application December 13, 1941, Serial No. 422,798

11 Claims. (Cl. 99—244)

Our invention relates generally to continuous butter-making processes, and it has particular relation to a method of, and apparatus for, developing a true butter texture in butter made according to such continuous procesess.

Substantial progress has been made in recent years in developing continuous butter-making processes. The primary object of this development has been to overcome the difficulties and objections associated with the prior art method of making butter which involved the churning of large batches of cream into butter. Except for the increased scale on which the operation was carried out, this prior art method of making butter on a commercial scale by churning remained essentially the same as that used by small dairymen and housewives from time immemorial.

Shortly after the production of butter on a commercial scale developed, it became apparent that it would be a great advantage to be able to produce butter by a continuous process as distinguished from the prior art churning operation, which is classified as being an intermittent or batch type process. It is a recognized principle of production engineering that where a product is to be produced in large quantities on a commercial basis, a continuous process has certain inherent advantages over an intermittent or batch type process. The principal advantages are that the continuous process gives a much greater production rate for the amount of equipment involved, and what is of equal or greater importance, standardization and control of the product may be more easily and accurately carried out in a continuous process. Thus, a continuous process of making butter has the possibility of permitting butter of improved quality and uniformity to be made at reduced cost.

However, one of the greatest difficulties encountered in developing a continuous butter-making process was that of obtaining a final butter product which had a texture corresponding to that of butter made by churning. Although several continuous processes were suggested and developed wherein products could be produced which had a chemical composition corresponding to that of ordinary butter as made according to the prior art churning processes, the physical aspect of such products were fundamentally different from ordinary butter. Insofar as we are aware it was not possible heretofore to produce a butter product with a continuous process that had the true butter texture with which the public is thoroughly familiar. This was a major difficulty, for the consuming public had become so accustomed to butter having the texture of the product made by churning that butter made according to any other process also had to have this same texture in order to be salable and to meet with large scale acceptance by the consumers.

Accordingly, the object of our invention, generally stated, is the provision of an apparatus and method for developing a true and natural butter texture in butter products made according to continuous butter-making processes. Although the invention is not limited to any particular type of continuous butter-making process, it has been found to be particularly adapted for developing a true butter texture in the butter product made according to our prior invention to which an application for United States Letters Patent, Serial No. 368,750, filed December 6, 1940, is directed, and of which application this application is a continuation in part.

According to our invention, a product having the composition of butter, but not having a true or natural butter texture, may be forcibly fed through a series of restricted orifices which may be disposed at spaced apart intervals in a conduit, and a true butter texture will be developed in the product as it passes through the apparatus.

For a more complete understanding of the nature and scope of our invention, reference may be had to the following detailed description thereof taken in connection with the accompanying drawings, in which:

Fig. 1 is a flow diagram of a plant wherein cream may be manufactured into butter by a continuous process of operation, involving the texture developing apparatus and method of the present invention;

Fig. 2 is a side elevational fragmentary view showing the details of construction of the freezer unit, forming a part of the plant shown in Fig. 1;

Fig. 3 is an enlarged fragmentary, vertical sectional view taken through one of the connections between the different sections of the texture developer of Fig. 1 and showing the details of one of the texture developing orifices provided therein;

Fig. 4 is a top plan view of the orifice-providing disk in the pipe connection shown in Fig. 3; and Fig. 5 is a view similar to Fig. 2 of a modified form of freezer unit adapted to intersperse a non-toxic, smoothness-imparting gas into a butter composition as it is chilled and solidified therein.

In making butter by a continuous process, it is first necessary to obtain concentrated milk fat in the continuous phase. In cream, which is the raw material in butter-making processes, the milk fat is in the dispersed or suspended phase while the water part of the cream is in the continuous phase. Although there are several possible processes by which the phases in cream may be reversed so as to obtain the milk fat in concentrated form in the continuous phase, the process described in our above-mentioned prior application for United States Letters Patent, Serial No. 368,750, provides a very satisfactory method of obtaining this product. In Fig. 1 of the drawings, the process of obtaining milk fat in the continuous phase disclosed in our above-mentioned application is combined with the texture developing feature of the present invention so as to obtain a high quality butter product. It will, however, be understood that the texture developing feature of the present invention is not limited solely to use in connection with the milk fat concentrating process described in our above-mentioned application.

Referring to Fig. 1 of the drawings, cream ordinarily of around 30–40 per cent milk fat is warmed to about 90° to 110° F. in a pre-warming vat 10. (If neutralization of the cream is desired, it may be carried out, for example, in the pre-warming vat 10 in accordance with the general practices in the art.) From the vat 10, the pre-warmed cream is pumped by a pump 11 through a pipe line 12 into a filter 13. Steam at around 90–100 pounds per square inch pressure is introduced into the line 12 from a steam supply line 14 connected therewith, as shown. The steam serves to warm the cream so that it enters the filter 13 at around 135° F. The filtered cream is conducted from the filter 13 through a pipe line 15 into a flash pasteurizer unit 16 which may be of the well-known "Jensen" type. Steam is introduced into the line 15 from a steam supply line 17 and mixes with the filtered cream so that as it enters the bottom of the pasteurizer 16 it will be at a temperature of around 150° to 160° F. The cream ordinarily remains in the pasteurizer 16 for about ten to fifteen seconds wherein it is heated to about 190° to 194° F., for example, by indirect steam. From the top of the pasteurizer unit 16, the cream passes through a pipe line 18 into a supply tank 20 wherefrom it is ready to be delivered to a zone of sub-atmospheric pressure or vacuum-steam treatment.

The pasteurized cream, ordinarily at around 175° to 190° F., is withdrawn from the supply tank 20 through a pipe line 22 into a vacuum pasteurizer 23 which may be of the type described in detail in United States Patent 2,022,420, issued November 26, 1935, to Hammer, Horneman, and Parker. The pressure in the pasteurizer or vacuum chamber 23 is sub-atmospheric and is ordinarily maintained at a vacuum of around 25 to 26 inches of mercury so that the temperature in the chamber will be around 130° F. Steam at around 90 pounds per square inch pressure is introduced into the bottom of the pasteurizer 23 through a number of steam pipes 24, connected as shown, whereby it comes into direct contact with the cream while at the reduced pressure. The desired pressure and temperatures are readily maintained in a vacuum chamber 23 by withdrawing water vapor and volatile off-flavors from the top of the chamber 23 at 25 by means of a vacuum pump (not shown). The treated cream, with substantially no loss or gain in its moisture content, collects in the bottom of the chamber 23 and is pumped therefrom by a pump 26 through a pipe line 27 into a centrifuging separator 30. The temperature of the cream in the separator 30 is ordinarily around 125° F., and in every case should be at least above the particular melting point of the milk fats present in the cream.

In the separator 30 (which may be of the ordinary centrifuge type) the milk fats are obtained in the continuous phase and are separated from the protein, skim milk, etc. which are expelled from the separator at 31. The fat product containing about 80–98 per cent milk fat, depending upon the extent of the centrifuging action, is withdrawn from the top of the separator 30 through a pipe line 32 into a milk fat storage tank 33. From the vat 33, the milk fats in the continuous phase and still in the liquid state are pumped by a pump 34 through interconnected pipes 35 and 36 into a mixing chamber or unit 37. A vat 40 serves to hold a controlled aqueous solution of salt and starter flavor, etc., which may be pumped at a predetermined rate by a pump 41 through a pipe line 42 and the line 36 into the mixing chamber 37 wherein it is thoroughly mixed with the incoming fat from the vat 33. The resulting butter-forming mixture leaving the mixing chamber 37, and ordinarily containing at least 80 per cent milk fat, is delivered through a pipe line 43 by a pump 44 into a freezer unit 45. In the freezer unit 45, the liquid butter-forming mixture is solidified or chilled so as to form a brittle, waxy, oily tasting mass. The pressure from the pump 44 serves to force this brittle, waxy mass through our texture developer unit indicated generally at 46, wherein a true butter texture is developed therein. The butter leaving the texture developer unit 46 is delivered to a packaging machine 47. The details of construction of the freezer unit 45 and our texture developer unit 46 are described in detail hereinafter.

It will be understood that the above detailed process of obtaining concentrated milk fat in a continuous manner is intended to be illustrative and that certain other methods of obtaining concentrated milk fat in a continuous phase from cream may be used. Likewise, the temperatures and pressures above cited in connection with the operation of the vacuum pasteurizer 23 and the centrifugal separator 30, are illustrative of typical operating conditions, and certain other values of temperature and pressure may be used depending upon conditions involved.

The change in the cream during the vacuum-steam treatment above described is not fully understood. Our investigations indicate that subjecting the cream to the sub-atmospheric pressure produces an expansion of the cream and that the action of the steam (e. g. high pressure steam of around 90 to 100 pounds per square inch back of the valve) coming into direct contact with the cream while in the expanded stage modifies the milk fat globules so that they separate in the continuous phase when subjected to the centrifuging action in the separator 30. Our investigations also indicate that the best results are obtained when the cream entering the zone of sub-atmospheric pressure is pre-heated to a temperature greater than the temperature of saturated steam at the reduced pressure. The fact that the fat is obtained in the continuous phase indicates that the complex protein-fat hull or membrane surrounding the milk fat globules is modified physically, or chemically, or both, by the combined vacuum and steam treatment in the chamber 23. It will be understood, however, that the present invention is not limited by any particular theoretical explanation.

The adding of a controlled amount of water, and desired amount of salt and flavor starter, to the concentrated fat in the mixing unit 37 makes possible a more uniform and finer dispersion of water in fat, resulting finally in an improved butter texture. The amount of water or aqueous solution added varies with the percentage of milk fat in the concentrate from the vat 33 (ordinarily around 85–95 per cent) and is controlled so that the final product ordinarily contains at least 80 per cent milk fat.

Furthermore, our particular process produces a more stable butter due both to the fine dispersion of the water through the continuous fat phase, and to the low protein content of the milk fat. In this latter connection, it will be noted that a substantial proportion of the nitrogenous or protein material—one of the bacteria foods of butter—is separated from the milk fat in the centrifuging separator 30. The process also produces a more uniform butter due to the removal of the original water and the water soluble materials in the cream, which, as obtained in practice, contains only around 35 per cent of the desired milk fat. The advantage is obtainable by separating out the original non-fat materials and replacing them with controlled aqueous starter mixtures free from undesired contamination, as will be obvious to those skilled in the art. An additional advantage resides in the elimination of "churning" carried out today for the most part in bacteria contaminated wooden churns.

In the specification and claims, the term "starter" refers to starter cultures. These cultures are well known in the art and serve as flavoring constituents or means in the manufacture of butter. Likewise, in the specification and claims the term "cream" refers to ordinary cream in which the milk fat is in the disperse phase, i. e., dispersed as an emulsion in a continuous phase of non-fat milk liquids.

Referring to Fig. 2 of the drawings, it will be seen that the freezer unit 45 comprises an inner cylinder 50 in which the butter-forming mixture pumped from the mixing tank 37, Fig. 1, is chilled and solidified. A brine jacket 51 is disposed around the inner cylinder 50 so that a refrigerant may be circulated in heat conductive relationship with the inner cylinder 50. The brine chamber 51 is covered with insulation or lagging 52, and refrigerant inlet and outlet openings 53 and 54, respectively, are provided adjacent the opposite ends of the jacket 51 for delivery to and withdrawal of refrigerant from the freezer 45. Brine serves very satisfactorily as a refrigerant for use in the freezer unit 45.

The inner freezing cylinder 50 is closed at its opposite ends by a pair of heads 55 and 56 connected in flange to flange relationship therewith, as shown. The head 55 attached to the left-hand end of the cylinder 50 has an inlet opening or connection 57 integrally formed as part thereof and to which the butter-forming mixture pipe line 43 is connected. The right-hand head 56 is provided with a jacketed outlet connection 58 through which the chilled and solidified mass may be delivered to the texture developer unit 46. Central openings are provided through each of the head units 55 and 56 so as to accommodate a hollow shaft 60 which passes longitudinally through the freezer unit 45. The shaft 60 is journalled in the heads 55 and 56, which serve as bearings therefor. A pair of stuffing boxes 61 and 62 are provided on each end of the heads 55 and 56, respectively, so as to provide a fluid tight seal about the rotating shaft 60.

A helical screw 65 is carried on the shaft 60 within the freezing chamber 50 as shown. The function of the screw 65 is to scrape the chilled butter-forming mixture from the inner surface of the chamber 50 where it is solidified, and also to aid in forcibly feeding the material from left to right through the freezer unit 45. The screw 65 also acts as an agitator for the partially solidified and partially liquid butter-forming mass in the cylinder 50, particularly in the left-hand half thereof wherein a substantial portion of the contents are still in the liquid state. A pulley 66 is keyed to the left-hand end of the shaft 60 outside of the freezer 45 so as to provide means for rotatably driving the shaft 60 and the screw 65 carried thereon.

The shaft 60 is preferably tubular or hollow so that hot water may be circulated therethrough for the purpose of melting off solidified butter-forming mass which may be frozen on the shaft 60 or on the helical screw 65. This is particularly important in connection with the cleaning of the freezer unit 45 for it permits substantially all of the mixture in the cylinder 50 to be forced out the right-hand side thereof through the outlet connections 58.

As stated, the jacketed outlet connection 58 of the freezer unit 45 is connected with our novel texture developer unit 46, as shown in Fig. 1 of the drawings. The particular texture developer unit 46 shown is made in four sections each of which comprises an inner tube or conduit through which the butter-forming mass is fed, and an outer jacket for circulating water. One of the connections between these four sections is shown in detail in Fig. 3 of the drawings. As there shown, the lower end 71 of the inner pipe 70 in the upper section is counter-bored so as to fit over the upper end 72 of the inner pipe 70 in the next lower section. A disk member 74, shown in plan view in Fig. 4, is supported in between the interfitting pipe ends 71 and 72, as shown. The disk member has a restricted slot-shaped orifice 75 centrally formed therein through which the butter mass is forced as it is fed through the texture developer 46. The disk member 74 is so machined and designed that it is generally cup-shaped with a short portion formed on the bottom thereof which fits into the pipe end 72, while an annular shoulder abuts against the top face of the pipe end 72. The upper edge of the disk member 74 fits accurately in a shoulder formed in the counter-bored pipe end 71 as indicated at 76. The inside of the disk member 74 is preferably smoothly cupped and rounded so as to present a funnel-shaped butter receiving end so that there will be no sharp corners in which butter may be collected and retained.

The upper pipe 70 is surrounded by a jacket section 80 having an inset skirt 81 integrally formed on the lower end thereof which fits accurately within the upper end of a lower jacket section 80 surrounding the lower inner pipe 70. The jacket sections 80 are provided with opposing integral flanges 83 and 84 which are separated by a gasket member 85. A number of swing clamps 86 are carried on the lower jacket section 80 below the flange 84 which are adapted to swing up around the flanges 83 and 84, as shown. A set screw 87 with a wing nut head is provided in a threaded hole in each of the clamp members 86 so that it may be tightened down against the upper face of the flange 83, as shown. Any suitable number of the clamps 86, such as three, four or five, may be provided, as required.

Certain other types of connections between the different sections of the texture developer unit 46 may be used, but the design shown in Fig. 3 represents one satisfactory design which permits the sections to be conveniently and readily taken apart for cleaning and permits the convenient reassembly thereof.

Warm water may be supplied into the upper end of the texture developer unit 46 through the annular passageway formed in an inlet connection 90, and may be withdrawn from the lower section through an outlet pipe 91. The inlet connection 90 comprises an inner pipe 73 which communicates with the inner pipe 70 in the top section of the developer unit 46, and an outer jacket 82 which connects into the uppermost jacket section 80. The pipe 73 is provided with a valve 19 adjacent to the inner pipe 70, as shown. The water supplied through the annular space between the inner pipe 73 and outer pipe 82 should be at such a temperature and should be circulated at such a rate that the solidified butter mass will be slightly warmed and melted at the interior surfaces of the inner pipes 70 in the different sections of the texture developer 46. This permits the butter material to slip easily through the unit.

Disk members similar to the disk 74 are provided in each of the three connections at 92, 93 and 94 between the four sections of the texture developer unit 46, each having a restricted slot-shaped orifice similar to the orifice 75. Ordinarily it will be desirable to make the connection 92, 93 and 94 the same so that the parts may be interchanged. A fourth disk member (not shown) is provided at 95 at the lower end of the texture developer unit where the bottom section connects with an outlet fitting 96.

The orifice in the disk member at the connection 95 may be circular instead of slot-shaped, and may be somewhat smaller than the other slot-shaped orifices 75 in the other disk members 74 at the connections 92, 93 and 94. For example, the slot-shaped orifices 75 in the disk members 74 (Fig. 4) may be 1" x 1/16", while the orifice in the disk member in the connection 95 may be 1/16" in diameter.

The pressure from the delivery pump 44, together with the action of the screw 65 in the freezer unit 45, serve to forcibly feed the solidified butter-forming mass through the texture developer unit 46. When this mass leaves the freezer 45, it is in the form of a brittle, waxy mass, which is oily to the taste. As this mass is forced through the spaced-apart orifices provided in the texture developer unit 46, a true butter texture is developed therein. The exact reason and nature of the method in which the butter texture is developed in the mass as it passes through the orifices is not fully understood. Apparently, the minute droplets or globules of water or aqueous mixture are interspersed uniformly through the milk fat portion of the mass in a size which corresponds to that of the water portion of churned butter. In any event, a high grade natural butter texture may be developed in what was a brittle, waxy mass as it passes through the unit 46.

In certain instances it may be desired to intersperse a non-toxic, smoothness-imparting gas into the liquid butter-forming mixture as it is solidified or chilled. In Fig. 5 of the drawings, a freezer unit is indicated generally at 100 in which an inert gas such as nitrogen may be interspersed in the butter mixture as it is solidified therein. In general construction, the freezer unit 100 may closely follow that of the freezer unit 45 in Fig. 2. However, a connection 101 is provided leading into the lower left-hand end of the inner freezing chamber through which an inert gas such as nitrogen may be injected into the freezing chamber. The connection 101 connects with one side of a T-fitting 102 while a gas inlet pipe 103 having a valve 104 therein connects with the opposite side of the fitting 102. A pipe line 105 having a valve 106 therein is connected into the left-hand side of the fitting 102 and serves from time to time as an inlet for supplying warm water or steam into the freezing chamber for the cleaning thereof.

A modified form of helical screw 110 is provided on the tubular shaft running longitudinally to the freezer 100. The screw 110 is made up of a number of short blades 111 each of which is carried on a hub member 112 fastened on the longitudinal tubular shaft 109. The blades 111 are spaced a short distance apart, but in their general outline form a helical screw corresponding to the screw 65 in Fig. 2. The spacing between the blades 111 increases the chopping or agitating action of the screw 110 and serves to uniformly intersperse the inert gas entering the inlet connection 101 through the butter-forming mixture as it is solidified within the freezer unit 100.

Since certain further changes may be made in the foregoing construction and different embodiments of our invention may be made without departing from the scope thereof, it is intended that all matters described hereinbefore or shown in the accompanying drawings shall be interpreted as illustrative and not in a limited sense.

We claim:

1. Apparatus for converting a brittle, solidified butter mix into smooth textured, spreadable butter, comprising an elongated conduit, an element intermediate the ends of said conduit and having a single passageway of substantially less cross-sectional area than the corresponding cross-sectional area of said conduit on opposite sides of said element, and means for feeding the butter mix through said conduit and passageway.

2. Apparatus for converting a brittle, solidified butter mix into smooth textured, spreadable butter, comprising an elongated conduit, an element intermediate the ends of said conduit and having a single passageway of substantially less cross-sectional area than the corresponding cross-sectional area of said conduit on opposite sides of said element, and means for feeding the butter mix through said conduit and passageway, said element having a funnel-shaped receiving end for guiding the butter mix to said passageway.

3. Apparatus for converting a brittle, solidified butter mix into smooth textured, spreadable butter, comprising an elongated conduit, an element intermediate the ends of said conduit and having a single passageway of substantially less cross-sectional area than the corresponding cross-sectional area of said conduit on opposite sides of said element, and means for feeding the butter mix through said conduit and passageway, said element having a funnel-shaped receiving end for guiding the butter mix to said passageway, the inside wall of said funnel-shaped receiving end being merged into the inside walls of said conduit and passageway so as to avoid the formation of any butter mix trapping pockets in said conduit.

4. Apparatus for converting a brittle, solidified butter mix into smooth textured, spreadable butter, comprising a conduit, an element in said conduit having a single passageway of substantially less cross-sectional area than the corresponding cross-sectional area of said conduit, and disposed substantially coaxially with said conduit, said element having a funnel-shaped receiving end for guiding the butter mix into said passageway, the inside wall of said funnel-shaped receiving end being merged into the inside walls of said conduit and passageway so as to avoid the formation of any butter mix trapping pockets in said conduit, and means for feeding the butter mix through said conduit and passageway.

5. Apparatus for converting a brittle, solidified butter mix into smooth textured, spreadable butter, comprising an elongated conduit, a plurality of elements respectively disposed in longitudinally spaced portions of said conduit, each of said elements having a passageway of substantially less cross-sectional area than the cross-sectional area of said conduit, and means for feeding the butter mix through said conduit and through the passageways of said elements.

6. Apparatus for converting a brittle, solidified butter mix into smooth textured, spreadable butter, comprising an elongated conduit of cylindrical cross section, a plurality of elements respectively disposed in longitudinally spaced portions of said conduit, each of said elements having a passageway of substantially less cross-sectional area than the cross-sectional area of said conduit, the passageway in each of said elements being slot-shaped in cross section, and means for feeding the butter mix through said conduit and through the passageways of said elements.

7. Apparatus for converting a brittle, solidified butter mix into a smooth textured, spreadable butter, comprising a conduit of selected cross-sectional area, means in said conduit for substantially reducing the effective internal cross-sectional area of a portion thereof intermediate its ends, and means for feeding the butter mix through said conduit at a predetermined rate sufficient to cause the butter mix to pass through the reduced portion of the conduit with a substantially accelerated velocity relative to the velocity of its movement in the normal portions of the conduit on opposite sides of said means.

8. Apparatus for converting a brittle solidified butter mix into a smooth textured, spreadable butter, comprising an elongated conduit, means for feeding said butter mix through said conduit, and a plurality of elements respectively disposed in longitudinally spaced portions of said conduit, said elements extending transversely of the conduit and having passageways through which the butter mix is successively fed, the passageways in said elements being of substantially less cross sectional area than said conduit and one of said elements having a passageway of smaller cross sectional area than a preceding element.

9. Apparatus for texturating butter comprising, in combination, an elongated tubular element through which butter may be fed, pressure applying means for feeding butter to be texturated into and through said tubular element at a predetermined rate, and cup-shaped means for substantially reducing the effective internal cross-sectional area of a portion of said tubular element intermediate the ends of said tubular element.

10. Apparatus for texturating butter comprising, in combination, an elongated tubular texturating element through which butter may be fed, pressure applying means for feeding butter to be texturated into and through said tubular element, and means for substantially reducing the effective internal cross-sectional area of a portion of said tubular element intermediate the ends of said tubular element, said last mentioned means having a cup-shaped receiving end for guiding butter through the portion of said tubular element having the reduced internal cross-sectional area.

11. A texturating device of the class described comprising, in combination, a sectional elongated conduit, an element intermediate the ends of said conduit and having an opening therethrough of substantially less cross-sectional area than the unobstructed cross-sectional area of said conduit on opposite sides of said element, and means for feeding material to be texturated to and through said conduit and said element, said element being positioned in said sectional conduit at an end of a section thereof.

HERMAN C. HORNEMAN.
RALPH V. HUSSONG.
SIDNEY N. QUAM.
BERNARD W. HAMMER.

Certificate of Correction

Patent No. 2,395,051.  February 19, 1946.

HERMAN C. HORNEMAN ET AL.

It is hereby certified that the above numbered patent was erroneously issued to "Cherry-Burrell Corporation, of Chicago, Illinois, a corporation of Delaware, assignee by mesne assignments," whereas said patent should have been issued to *Sugar Creek Creamery Company, of Danville, Illinois, a corporation of Delaware, and Cherry-Burrell Corporation, of Chicago, Illinois, a corporation of Delaware, as joint owners, being assignees by direct and mesne assignments*, as shown by the record of assignments in this office; in the grant, line 15, for "Cherry-Burrell Corporation, its successors" read *Sugar Creek Creamery Company, and Cherry-Burrell Corporation, as joint owners, their successors*; page 1, second column, line 19, immediately following the words "is a continuation in part." insert the following paragraph—

*The aspects of this invention directed to the continuous process of making butter are disclosed and claimed in our Divisional Application Serial No. 626,234, filed November 2, 1945.*; and that the said Letters Patent should be read with these corrections therein that the same may conform to the record of the case in the Patent Office.

Signed and sealed this 6th day of August, A. D. 1946.

[SEAL]

LESLIE FRAZER,
*First Assistant Commissioner of Patents.*